May 30, 1944. K. T. SORENSEN 2,349,804
SERVO-MOTOR
Filed Jan. 23, 1942
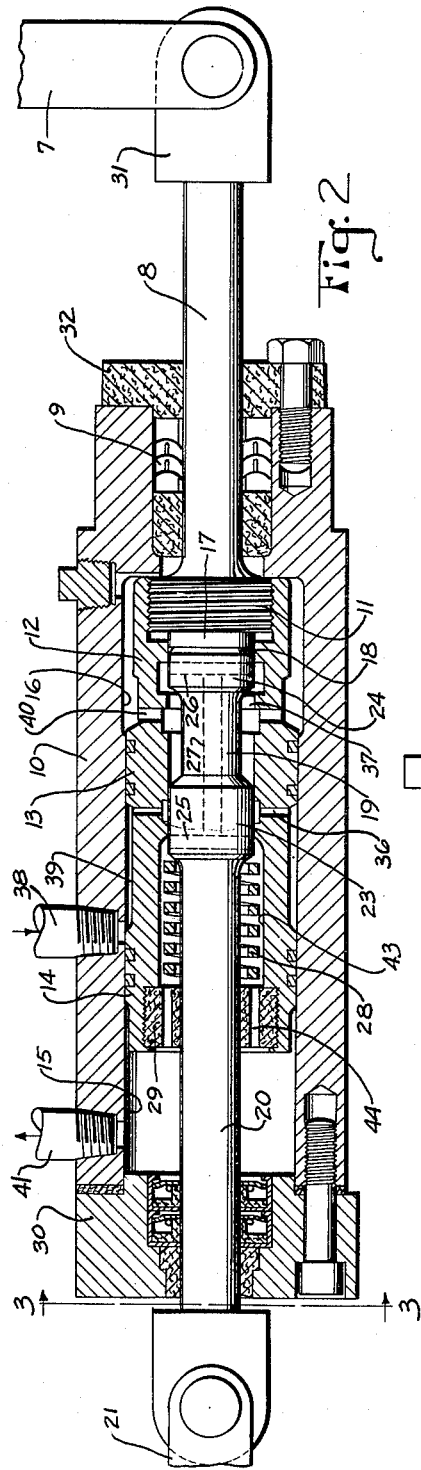
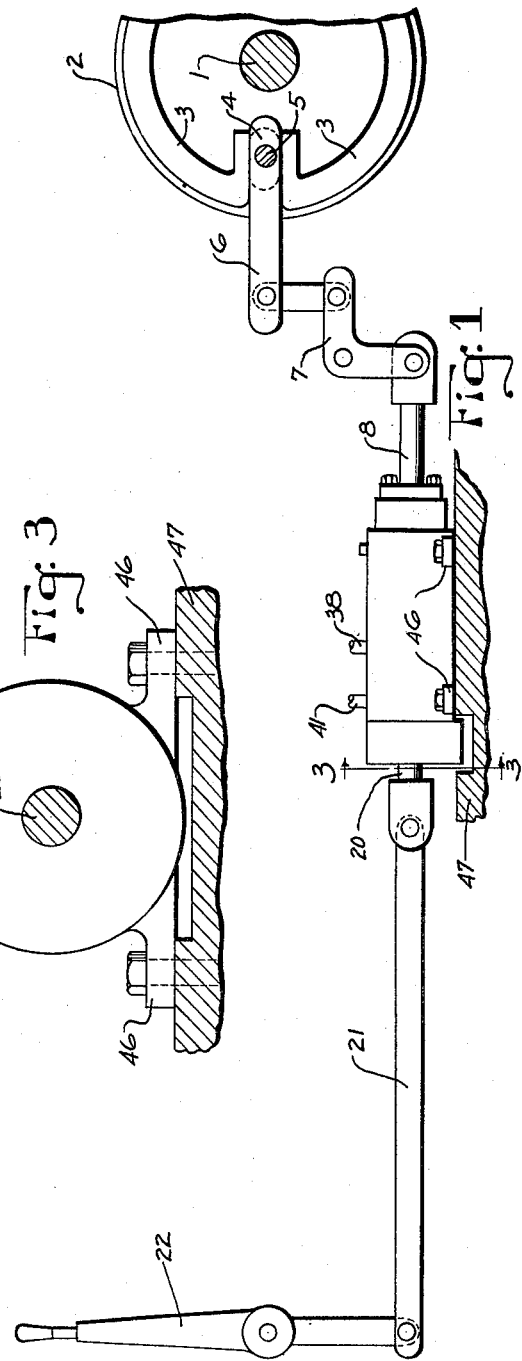
INVENTOR
K. T. Sorensen
BY
ATTORNEY Patented May 30, 1944

2,349,804

UNITED STATES PATENT OFFICE 2,349,804

SERVOMOTOR

Kresten T. Sorensen, Media, Pa., assignor to The Baldwin Locomotive Works, a corporation of Pennsylvania Application January 23, 1942, Serial No. 427,958

3 Claims. (Cl. 121—41)

This invention relates generally to apparatus for steering and braking military tanks, tractors or other heavy mobile apparatus of the type in which the wheels or track laying treads are selectively braked in order to turn the vehicle in either direction.

Various attempts have been heretofore made to provide means for applying braking pressure to one wheel or the other but these arrangements have been deficient in various respects when applied to massive vehicles such as military tanks weighing as much as twenty or thirty tons or more. One of the prior attempts to use servomotors resulted in lack of necessary stability and sensitivity or in inability to apply the braking action with a minimum manual force consistent with maintaining the necessary "feel" by the operator of the applied braking force.

It is one object of my invention to provide an improved brake control apparatus that is simple and positive in operation and that is adapted to apply a relatively large braking force with a relatively small manual operating force. A further object is to provide improved brake operating mechanism in which a large braking force may be applied while still allowing the operator to have a certain amount of "feel" of the braking operation when the braking force is applied. Another object is to provide an improved brake control apparatus that is normally power operated but which is adapted to be manually operated or to be automatically manually operable instantly upon occurrence of power failure.

Other objects and advantages will be more apparent to those skilled in the art from the following description of the accompanying drawing in which:

Fig. 1 is a diagrammatic side view of my improved brake control system applied to a schematic outline of a brake;

Fig. 2 is an enlarged sectional view through my improved combined servo-motor and control mechanism therefor; and Fig. 3 is an end view taken substantially on the lines 3—3 of Figs. 1 and 2.

In the drawing I have not illustrated a complete tank, tractor or other heavy vehicle as it is well-known that such apparatus is driven by an internal combustion engine connected through a transmission to a well-known differential gear, this differential being connected to oppositely extending shaft sections which drive the respective wheels or track driving gears on opposite sides of the vehicle. With the foregoing type of driving mechanism two independently operable brakes are employed for controlling the steering merely by braking one or the other of wheels or tracks. Hence, it will suffice for purposes of the present disclosure to merely diagrammatically indicate one shaft 1 for driving the wheel or track on one side of the vehicle, it being understood that the disclosure is duplicated for both sides of the vehicle. A brake drum is diagrammatically indicated at 2 and the brake bands or shoes at 3 may be spread apart by any desired means diagrammatically indicated as a cam 4 secured to a pivot shaft 5 and arm 6. Any other suitable or usual type of brake mechanism may be employed but as the brake mechanism per se does not constitute a part of my invention the foregoing diagrammatic brake disclosure will suffice.

To operate the brake lever 6 I connect the same through any suitable bell cranks or linkages 7 to a piston rod 8 which extends through a suitable packing 9 into a stationary cylinder 10. As shown in Fig. 2, the inner end of rod 8 has an enlarged head 11 threadedly connected to a piston 12 which has two annular sealing ring portions 13 and 14 each of which are slidable within a cylinder bore 15 of uniform diameter although the right end of this bore is slightly enlarged to form a chamber 16. The right end of piston 12 is also preferably slightly reduced in diameter thereby providing an ample fluid passage space leading to the right end of piston 12. The rod 8 is provided with a cylindrical centering shoulder 17 partially extending within and centrally disposed in a bore of an annular shoulder 18. To control the operation of piston 12 a manually operable valve 19 is slidable within the hollow interior of piston 12 and is connected by a rod 20 and linkage 21 to a hand lever 22. The valve has two spools 23 and 24 of equal diameter, the former being the longest of the two. A pair of transverse passages 25 and 26 are disposed internally of the spools and are connected by a longitudinal passage 27 located within the valve. The valve is normally biased to the right by a pre-compressed spring 28 interposed between spool 23 and a nut 29 threaded in the left end of piston 12. A suitable combined cylinder head and packing gland 30 is bolted to the end of the cylinder through which the piston, valve and rod 8 may be inserted as an assembled unit, it being understood that rod 8 has a removable link connecting head 31 to permit the packing 9 and packing gland head 32 to be assembled with cylinder 10.

*Operation.*—To apply the brakes the operator moves hand lever 22 in a clockwise direction thereby shifting valve 19 to the left to uncover lateral ports 36 and to close an axial circular port 37 whereupon fluid pressure, preferably hydraulic pressure from any suitable source, is admitted through pipe 38 to an annular space 39, thence inwardly through ports 36 and out through a second set of lateral ports 40 to the enlarged space 16 and to the right end of piston 12 thereby moving the piston to the left and consequently pulling on rod 8 to apply the brake 3. Simultaneously any pressure fluid that is present within the left end of cylinder bore 15 is discharged through an exhaust pipe 41 and back to a suitable pump to be recirculated in the pressure system. The operator moves hand lever 22 only to the extent to which he desires to apply the brake force and then holds the lever in this position. The servo-motor piston 12 discontinues its movement automatically when the desired braking action has been applied for the reason that by holding lever 22 in its adjusted position, valve 19 will remain stationary although piston 12 will continue to move to the left until finally ports 36 are closed by valve spool 23 thereby discontinuing the supply of fluid to the right end of piston 12. At this instant port 37 is still closed by spool 24. Hence fluid is trapped within the right end of chamber 16 to hold the brake. Only a minimum manual force is thus required to be applied to lever 22 to hold the brake. If it is desired to apply further braking force the operator will then move hand lever 22 still further in a clockwise direction thereby again shifting valve to the left so as to open ports 36 and admit fluid pressure from pipe 38 through ports 36 and 40 to chamber 16. When the operator holds lever 22 in its newly adjusted position, then piston 12 will ultimately overrun and close off port 36. Conversely, to release the brake applying force, the operator moves lever 22 in a counterclockwise direction thereby shifting valve 19 until spool 24 has abutting contact with centering plug 17 whereupon supply ports 36 remain completely closed while chamber 16 is open to exhaust through ports 40, axial port 37 and valve passages 26, 27 and 25 to the spring chamber 43 and thence through passages 44 to the left end of cylinder 15 constituting an exhaust chamber which discharges through exhaust pipe 41.

The piston 12 may be moved in its releasing direction, i. e. the right, by counterclockwise movement of lever 22 which is transmitted to the piston through the abutting contact with plug 17 or this releasing movement may be accomplished by the inherent resiliency of the braking structure which is subjected to an expanding brake applying force thereby to cause a return releasing movement of rod 8. Also usual and well-known brake shoe springs (not shown) would also cause reverse rotation of cam 4 with consequent right hand movement of piston 12. Releasing movement of piston 12 may be discontinued either by piston 12 engaging the right end of cylinder 10 or the operator may stop the releasing action at any desired point merely by holding lever 22 in whatever position is required. If supply of fluid pressure should fail the operator may then manually apply a braking force by moving hand lever 22 in a clockwise direction to fully compress spring 28 whereby a mechanical connection is created from rod 20 through valve spool 23, spring 28 and member 29 to piston 12 and the brake rod 8. On the other hand, when fluid pressure is available, spring 28 provides a small amount of resistance against shifting of valve 19 thereby giving the operator a definite "feel" of the control or movement of the brake applying rod 8 notwithstanding that this rod is being operated by power.

A further advantage of my improved apparatus is that any slack or lost motion throughout the linkage and brake system is automatically taken up before power is actually applied to the servo-motor. For instance, when the operator moves the hand lever 22 in a clockwise direction this movement is transmitted through rod 20 to move valve 19 simultaneously with piston 12 by reason of the interposed spring 28 which is sufficiently pre-compressed to overcome any resistance or inertia of the parts while the slack is being taken up. This mechanical action of directly taking up slack continues until all of the slack has been taken out of the brake and rod mechanism interposed between the brake shoes and the cylinder. When the resistance in rod 8 has increased sufficiently so that the pre-load on spring 28 is overcome, then further movement of lever 22 through rod 20 will move the valve spool 19 closing the exhaust port 37 and opening the pressure port 36 admitting oil into the cylinder space 16 so as to cause piston 12 to hydraulically follow the action of lever 22. A considerable portion of the lost motion may be created by wear of the brake shoe or drum and this wear may be of such an extent that hand lever 22 will mechanically move piston 12 say half way of the length of the cylinder 10 before hydraulic actuation takes place. Notwithstanding the presence of such considerable lost motion my improved floating servo-motor piston and control retains all of its qualities of simple, positive and sensitive control.

From the foregoing disclosure it is seen that I have provided a brake operating mechanism that is especially adapted for steering heavy vehicles or for effecting a braking action as by simultaneous application of the duplicate sets of braking controls for each of the tracks or wheels on each side of the vehicle. The apparatus is extremely simple, compact and positive and yet sensitive in operation and insures the necessary degree of "feel" for the operator as well as being automatically manually operable in the event of power failure. The spring 28 functions not only to give the desired "feel" but also to constitute the mechanical element for automatically transferring from power to manual operation if necessary to apply the brakes, the abutting contact of valve spool 24 with centering plug 17 insuring a positive manual release of the brakes if a positive releasing force should be required for any reason. The control cylinder 10 may be held in a stationary position in any desired manner such as by the provision of feet 46 formed on cylinder 10 and bolted to any stationary frame member diagrammatically indicated at 47.

It will of course be understood that various changes in details of construction and arrangement of parts may be made by those skilled in the art without departing from the spirit of the invention as set forth in the appended claims.

I claim:

1. A servo-motor for a control system comprising, in combination, a stationary cylinder, a piston having a rod for transmitting a force to the control system, an annular space disposed between the outer wall of said piston and said cylinder, a pressure fluid supply inlet formed in said stationary cylinder for communication with said space, said piston having a bore provided with a lateral supply port for conducting pressure fluid from said space to said bore and a second lateral port adapted to conduct pressure fluid from said bore to an operating end of said cylinder so as to move said piston, an exhaust chamber at the end of said cylinder opposite to said operating end, an axial flow port coaxial with said bore, a valve within said bore, an exhaust passage movable with said valve adapted to connect said coaxial port and exhaust chamber to allow communication between the same when said coaxial port is open, said valve having provision adapted to directly close said coaxial port and to connect said lateral ports with each other thereby to supply pressure fluid to said operating end of the cylinder so as to move said piston or to close said lateral supply port and open said coaxial port thereby to allow discharge of fluid from the operating end of said cylinder through said second lateral port and coaxial port to said movable exhaust passage and thence to said exhaust chamber, and a spring for biasing said valve in a direction tending to open said coaxial port.

2. The combination set forth in claim 1 further characterized in that said movable exhaust passage comprises a passage formed internally of said valve extending axially to communicate with said exhaust chamber at one end of the cylinder and to communicate with said coaxial port at the other end of the cylinder whereby upon opening of said coaxial port fluid is discharged through said valve to said exhaust chamber.

3. The combination set forth in claim 1 further characterized in that the movable exhaust passage is formed internally of said valve and extends axially to communicate with said exhaust chamber at one end of the cylinder and to communicate with said axial port at the other end of the cylinder whereby upon opening of said coaxial port fluid from said exhaust chamber is discharged through said valve, and the spring is interposed between said valve and the end of said piston and adjacent the exhaust chamber whereby said internal valve passage discharges fluid therefrom through the space containing said spring.

KRESTEN T. SORENSEN.